March 19, 1968  E. T. THOMSON  3,373,830
WEIGHING CELL
Filed July 27, 1965

INVENTOR.
EDWARD T. THOMSON
BY
Bilker, Kimmelman & Mayerman
ATTORNEYS

United States Patent Office 3,373,830
Patented Mar. 19, 1968

3,373,830
WEIGHING CELL
Edward T. Thomson, Phoenixville, Pa., assignor to Automatic Timing & Controls, Inc., King of Prussia, Pa., a corporation of Pennsylvania
Filed July 27, 1965, Ser. No. 475,151
5 Claims. (Cl. 177—168)

This invention relates to a weighing cell and in particular to a cell in which a load supporting structure is resiliently supported by means of a plurality of flexure members. In particular, the invention relates to a novel flexure plate weighing cell which includes an associated member such as a transducer for producing an output signal as a function of the displacement of said flexure plates.

While weighing cells of the general type described in the present specification are known there is need for such cells in which there is an adjustable tare feature which is easily accessible for relatively trouble-free adjustment. In addition, it is highly desirable that the tare feature of such cells have greater range of adjustment than those presently available. To meet the increasing completition in this field it is also desirable that such cells be efficiently designed so that their cost and hence their ultimate sales price can be lowered. A high degree of accuracy, especially repeat accuracy, is also a desideratum.

It is therefore among the objects of the present invention to provide a weighing cell of the flexure-plate type which has:

(1) An adjustable tare feature which is continuously adjustable and accessible without appreciable disassembly thereof.

(2) An adjustable tare feature which has a considerably wider range than those presently available.

(3) Lower manufacturing cost due to more efficient design, and (4) Very high repeat accuracy.

Still other objects of the invention will occur to those skilled in the art upon reading the specification herein in conjunction with the drawings.

In accordance with the present invention I have provided a weighing cell of the type which includes a plurality of vertically spaced flexure plates each of which has one end anchored in a stationary upright member. The other ends are fixed to two respective subassemblies to which two spaced upright members are connected. These upright members are vertically displaceable when a load to be weighed is placed on a platform mounted to the subassembly positioned over their upper ends. The cell may also be equipped to handle tension loads suspended from it.

A rigid horizontal member is fixed to the stationary member and extends outwardly therefrom intermediate the flexure plates. A helical spring has its upper end mounted to the free end of the rigid horizontal member and its lower end connected to a threaded member which passes through an aperture in the lower subassembly. The compression or decompression of the spring (and hence the tare is adjusted by merely removing the bottom cover of the cell housing and/or by removing a panel in the housing and rotating several easily accessible nuts screwed onto the threaded member on each side of the aperture in the subassembly. Rotation of nuts changes the distance that the threaded member extends through the aperture and hence the tension on the spring. The armature of a differential transformer is arranged to move in unison with the vertically displaceable members through fixed windings to produce an output which is a function of the vertical displacement of the upright members.

Figure 1:
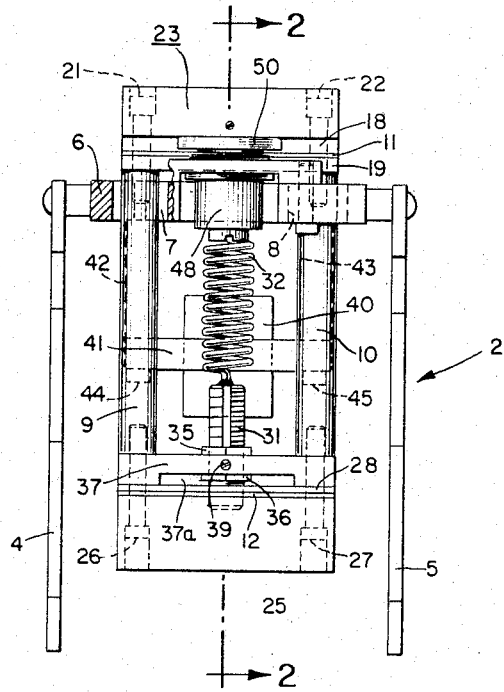
FIGURE 1 is an end elevation of the weighing cell according to one form of the present invention.
Figure 3:
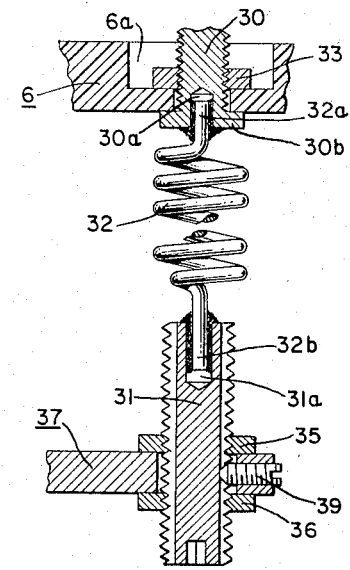
FIGURE 3 is an enlarged, partly sectional, fragmentary view of a portion of the apparatus shown in FIG. 2.
Figure 2:
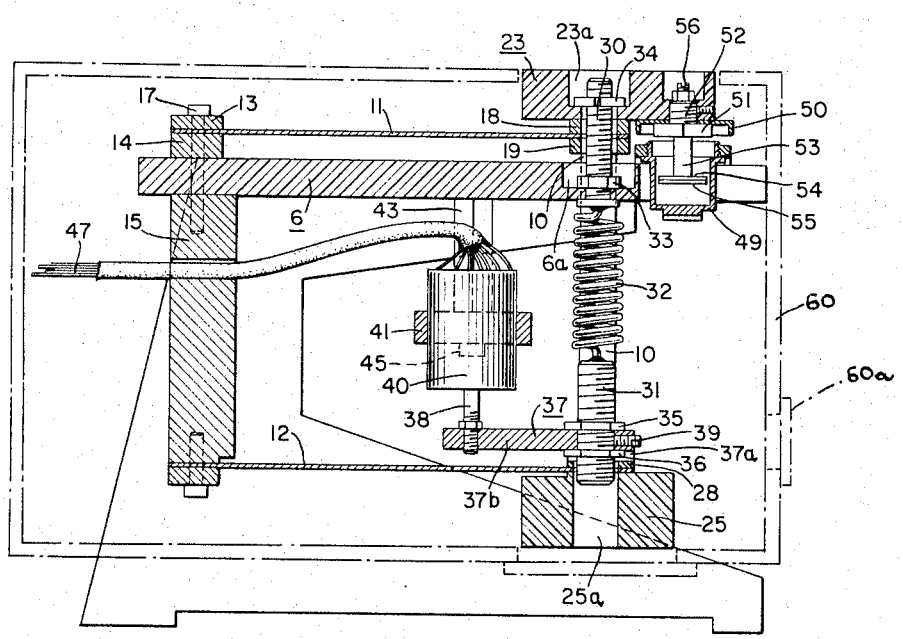
FIGURE 2 is a sectional view of the apparatus shown in FIG. 1 taken along the section line 2—2 in the direction indicated.

Referring to FIG. 1 there is shown a novel weighing device in accordance with one form of the present invention. Two vertical supporting plates 4 and 5 are shown which are typical of one type of mounting although these may be dispensed with where the cell is packaged in a housing. Between these plates a rigid member 6 extends which is affixed thereto by screws or any other appropriate means. The member 6 is provided with aligned apertures 7 and 8 at its free end through which pass, respectively, two rigid rods 9 and 10. Upper and lower flexure plates 11 and 12 are also provided. Flexure plate 11 has one end clamped between members 13 and 14. Bolts 16 and 17 pass through aligned apertures formed in plate 11, members 13 and 14, horizontal supporting member 6, and are screwed into aligned and threaded apertures in vertical supporting member 15. The other end of flexure plate 11 is fixed between two elongated rigid members 18 and 19. The upper ends of the rods 9 and 10 are maintained in fixed contact with the underside of member 19 by bolts 21 and 22 that pass downward through aligned apertures in members 18, 11, 19 and are screwed into threaded apertures in rods 9 and 10 respectively.

The lower ends of the vertical members 9 and 10 are bolted to a lower horizontal bar 25 by bolts 26 and 27 which pass upward through aligned apertures in bar 25, flexure plate 12, member 28, member 37, and are screwed into threaded apertures in the vertical members 9 and 10.

Not part of the present invention, and illustrated herein just to show a typical cell incorporating the invention is a dashpot subassembly indicated generally at numeral 48. It comprises a cup 49 in which a suitable hydraulic medium is disposed and a cover member 50. Cup 49 is connected to stationary member 6 whereas cover 50 is fixed by nut 51 about a threaded member 52 to movable bar 23. The piston 53 has one fixed face member 54 and one rotatable face 55 which may be rotated by movement of set screw 56. Since faces 54 and 55 are generally rectangular, changing the rotary position of member 55 changes the effective cross section of the composite faces and thereby changes the damping or speed of response of the cell.

Between the vertical supporting members 9 and 10 is located a pre-loading or tare adjusting assembly which comprises an upper threaded member 30, a lower threaded member 31 and a helical spring 32. Spring 32 may be made, for example, of "Ni-Span C," a metal with a constant modulus of elasticity with respect to temperature. The upper end 32a of helical spring 32 is cemented within an opening 30a in the member 30. The member 30 has a lower flanged end 30b and is held fixed within an aperture 6a in member 6 by means of a nut 33. The upper portion of member 30 passes through aligned apertures found in members 11, 18, 19, and in member 23. A nut 34 is screwed around the upper end of threaded member 30 in recess 23a and serves to limit the upward movement of plate 11.

The lower end of spring 32 is cemented within an opening 31a in the upper end of the threaded member 31. The cement may be, for example, the industrial resin adhesive known as "Eccobond 45" sold by Emerson and Cuming, Inc. Member 31 is fixed to the horizontal plate 37 by means of a retainer nut 35 and a tare adjusting nut 36. The entire cell may be enclosed in a container indicated by the broken line 60. Container 60 may have a removable panel located opposite elements 36, 37, 39 to facilitate making of the tare adjustment as described below. It may also have an opening formed therein below block 25 to permit a tension load to be connected to block 25 by means of aperture 25a which may be threaded to receive a hook or similar device for this purpose.

In accordance with the present invention it is possible to adjust the tare portion of the weighing cell merely by removing the housing panel and slipping a thin open-end wrench into the slit 37a to engage nut 36 after having loosened the retainer nut 35 and the set screw 39. If the tare nut 39 is turned clockwise (as viewed from above) the tension on spring 32 will be decreased so that the vertical members 9 and 10 will be pulled downward somewhat. On the other hand, if the tare nut 36 is turned in a counterclockwise direction, the tension on the spring 32 will increase so that the members 9 and 10 will move upward. After having adjusted the tare nut 36, the set screw 39 is again tightened so that its inner end presses tightly against the longitudinal surface groove 31a of the member 31. Then the retainer nut 35 is tightened and the output of the differential transformer 40 is checked for the desired "null" point.

The differential transformer 40 has a vertical armature 38 which is mounted to portion 37b of member 37. The armature moves within primary and secondary windings mounted in a cylindrical canister that is fitted into an aperture in supporting member 41. The latter is itself suspended by two studs 42 and 43 into which bolts 44 and 45 are respectively screwed. The studs are fixed to the underside of horizontal member 6.

It is seen that adjustment of the tare is accomplished by rotation of a simple and very accessible nut. With the present invention the tare adjustment can be made, for example, about eight times the rated span load. This cell has given repeat accuracy on the order of .01% of the maximum weighing range of the cell but is no larger than competitive cells. Moreover, its efficient design has resulted in economies of manufacture.

As modification of the structure shown herein which do not depart from the essence of the present invention will occur to those skilled in the art upon reading the foregoing specification with reference to the drawings herein, I desire the present invention to be limited solely by the claims herein.

I claim:
1. A weighing cell comprising:
 (a) at least one substantially horizontal flexure plate having one positionally fixed end,
 (b) a first horizontal subassembly which receives a load to be weighed connected to the other end of said flexure plate,
 (c) a positionally fixed and rigid horizontal member disposed below said flexure plate,
 (d) a second horizontal subassembly vertically spaced from said first subassembly, said second subassembly being disposed below said horizontal member and being connected to said first subassembly for movement in unison therewith, said second horizontal subassembly having a vertical portion in which a slot is formed,
 (e) vertical spring means whose upper end is connected to said rigid member,
 (f) a vertical spring tensioning member whose upper end is connected to said spring means, said tensioning member being threaded and having a portion thereof which passes through an aperture in said second horizontal subassembly, and
 (g) a horizontal nut which engages said (f) member and which is disposed in said slot to adjust the vertical position of said (f) member when rotated, said nut being accessible for rotation through said slot,
 (h) means attached to said (d) subassembly for producing relative movement between an inductive member and a core associated therewith.

2. A weighing cell comprising:
 (a) a plurality of vertically spaced horizontal subassemblies, the upper one of which is constructed to receive a load to be weighed, said subassemblies being connected together by rigid means to enable movement of said subassemblies to be in unison,
 (b) a plurality of vertically spaced horizontal flexure plates having corresponding respective ends positionally fixed and corresponding other ends respectively connected to said horizontal subassemblies,
 (c) a positionally fixed rigid horizontal member disposed between said flexure plates,
 (d) a first vertical threaded member whose lower end passes through an aperture in said rigid horizontal member and is fixed thereto, said first threaded member also passing through the upper one of said subassemblies and being provided with means to limit the upward movement thereof,
 (e) a vertical helical spring whose upper end is connected to the lower end of said first threaded member,
 (f) a second vertical threaded member whose upper end is connected to the lower end of said spring and whose lower end passes through an aperture in the lower one of said horizontal subassemblies, said lower subassembly also having a slot therein generally transverse to the axis of said threaded member, and
 (g) a horizontal nut in said slot and engaging said threaded member, said nut being accessible through said slot for rotation thereby to adjust the tension on said spring.

3. The weighing cell according to claim 2 wherein two upright members constitute the rigid means which enables movement of said subassemblies in unison, said upright members passing through horizontally displaced apertures in said horizontal member and wherein said (e), (f) and (g) elements are disposed between said upright members.

4. The weighing cell according to claim 2 with the addition of means coupled to said lower subassembly for generating an electrical signal as a function of the vertical displacement of said subassemblies by the load to be weighed.

5. The weighing cell according to claim 4 wherein said signal-generating means includes a first component of a differential transformer and wherein a second component of said transformer is disposed in fixed position with respect to said first component, said first and second components cooperating, on movement of said first component relative to said second component, to produce said electrical signal.

References Cited
UNITED STATES PATENTS

| | | | |
|---|---|---|---|
| 66,524 | 7/1867 | Shaler | 177—229 |
| 2,646,274 | 7/1953 | Weckerly | 177—229 X |
| 2,821,376 | 1/1958 | Aston | 177—229 X |
| 3,023,822 | 3/1962 | Knobel | 177—229 X |
| 3,137,358 | 6/1964 | Jungmayr | 177—229 X |
| 3,142,349 | 7/1964 | Blodgett | 177—229 X |

RICHARD B. WILKINSON, *Primary Examiner.*

G. H. MILLER, JR., *Assistant Examiner.*